United States Patent
Cho et al.

(10) Patent No.: US 10,338,688 B2
(45) Date of Patent: Jul. 2, 2019

(54) ELECTRONIC DEVICE AND METHOD OF CONTROLLING THE SAME

(71) Applicant: SAMSUNG ELECTRONICS CO., LTD., Suwon-si (KR)

(72) Inventors: Yong-jin Cho, Seongnam-si (KR); Sung-yeon Lee, Yongin-si (KR); Ki-hwan Kim, Seongnam-si (KR); Jong-yoon Kim, Seoul (KR); Moon-ki Yeo, Seoul (KR); Dae-kyu Lee, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 4 days.

(21) Appl. No.: 15/390,229

(22) Filed: Dec. 23, 2016

(65) Prior Publication Data

US 2017/0185160 A1 Jun. 29, 2017

Related U.S. Application Data

(60) Provisional application No. 62/387,184, filed on Dec. 24, 2015.

(30) Foreign Application Priority Data

May 4, 2016 (KR) .................. 10-2016-0055768
Nov. 7, 2016 (KR) .................. 10-2016-0147636

(51) Int. Cl.
*G06F 3/01* (2006.01)
*G06F 3/0346* (2013.01)

(52) U.S. Cl.
CPC .............. *G06F 3/017* (2013.01); *G06F 3/011* (2013.01); *G06F 3/016* (2013.01); *G06F 3/0346* (2013.01)

(58) Field of Classification Search
CPC .......... G06F 3/017; G06F 3/011; G06F 3/016; G06F 3/0346
USPC ........................................ 345/8, 156
See application file for complete search history.

(56) References Cited

U.S. PATENT DOCUMENTS

| 4,737,794 | A | 4/1988 | Jones |
| 5,670,987 | A * | 9/1997 | Doi ................. B25J 9/1692 345/156 |
| 7,301,648 | B2 | 11/2007 | Foxlin |
| 8,616,974 | B2 | 12/2013 | Rubin et al. |

(Continued)

FOREIGN PATENT DOCUMENTS

| JP | 2000-29621 A | 1/2000 |
| JP | 2007-157120 A | 6/2007 |

(Continued)

OTHER PUBLICATIONS

"The Oculus Rift, Oculus Touch, and VR Games at E3" Oculus Blog, Jun. 11, 2015, 16 pages total, https://www3.oculus.com/en-us/blog/the-oculus-rift-oculus-touch-and-vr-games-at-e3/.

(Continued)

*Primary Examiner* — Stephen G Sherman
(74) *Attorney, Agent, or Firm* — Sughrue Mion, PLLC

(57) ABSTRACT

The disclosure relates to a method of controlling an electronic device, the method includes, based on a magnetic field generated by a source, obtaining a coordinate of a user's hand; and reflecting the obtained coordinate of the user's hand in a virtual reality environment based on a change of a location of the source due to a movement of the user.

14 Claims, 16 Drawing Sheets

(56) References Cited

U.S. PATENT DOCUMENTS

| | | |
|---|---|---|
| 8,959,013 B2 | 2/2015 | Galor et al. |
| 9,141,194 B1 | 9/2015 | Keyes et al. |
| 9,360,682 B1* | 6/2016 | Edwards ............... G02C 11/10 |
| 2003/0062675 A1* | 4/2003 | Noro ................... A63F 3/00643 |
| | | 273/237 |
| 2006/0007137 A1* | 1/2006 | Salvatori ............ H04N 5/44513 |
| | | 345/156 |
| 2011/0187638 A1* | 8/2011 | Chao ........................ G06F 3/01 |
| | | 345/156 |
| 2011/0199305 A1* | 8/2011 | Suh ........................ G06F 3/014 |
| | | 345/158 |
| 2014/0160055 A1 | 6/2014 | Margolis et al. |
| 2014/0240225 A1* | 8/2014 | Eilat ....................... G06F 3/017 |
| | | 345/156 |
| 2014/0253691 A1 | 9/2014 | Holz |
| 2015/0241969 A1 | 8/2015 | Elangovan et al. |
| 2016/0033768 A1 | 2/2016 | Pedrotti |

FOREIGN PATENT DOCUMENTS

| | | |
|---|---|---|
| KR | 10-1497829 B1 | 3/2015 |
| KR | 10-1524576 B1 | 6/2015 |
| RU | 2542793 C1 | 2/2015 |

OTHER PUBLICATIONS

"Sixense's STEM, Full-Body Presence in Virtual Reality", Sixense, Sep. 13, 2013, 20 pages total, "http://sixense.com/wireless".
"Leap Motion's Leap Motion", 3D Motion and Gesture Control for Virtual Reality, Jan. 16, 2013, 12 pages total, https://www.leapmotion.com/product/vr, https://developer.leapmotion.com/vr-setup.

* cited by examiner

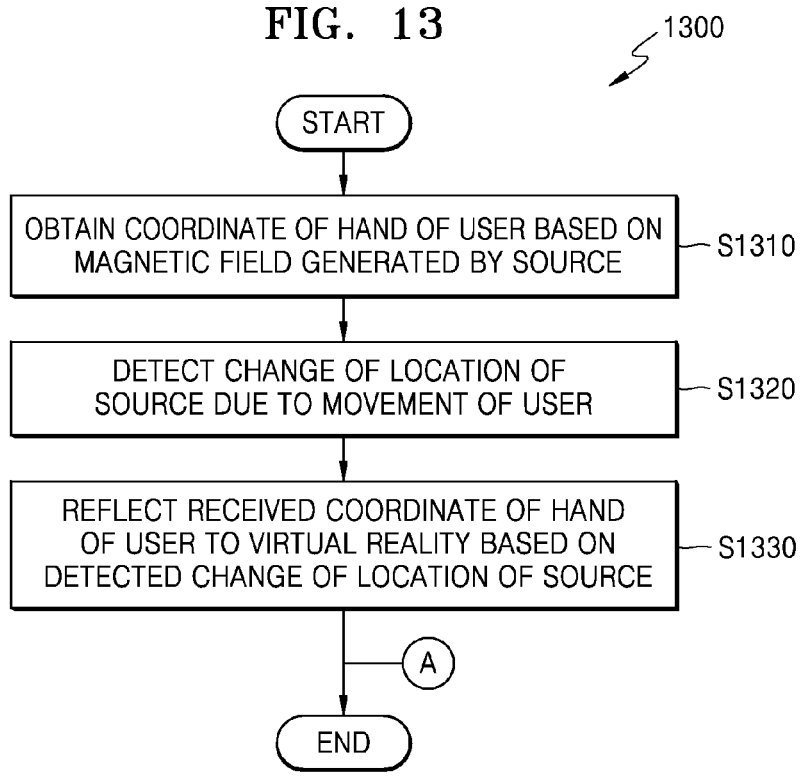
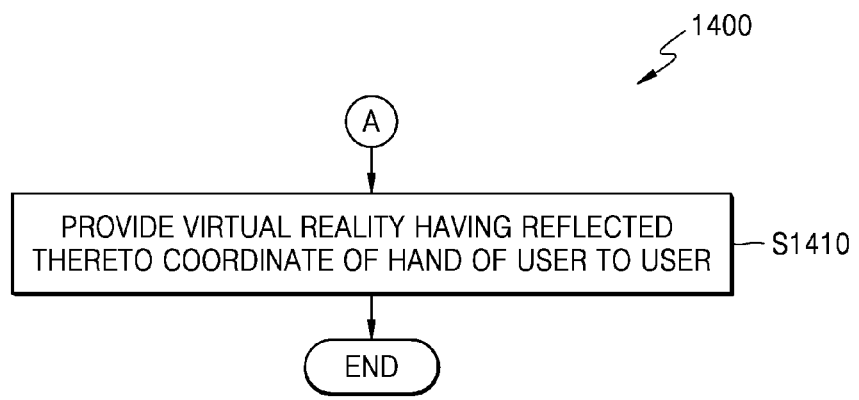

FIG. 16

| DATA START | DEVICE TYPE | DEVICE STATUS | MESSAGE TYPE | HAND LOCATION INFORMATION | HAND REVOLUTION INFORMATION | FINGER MOVEMENT INFORMATION | BUTTON INFORMATION | DATA END |

FIG. 17

| FIELD | DESCRIPTION |
|---|---|
| DATA START | NOTIFIES BEGINNING OF MESSAGE AND IS USED FOR CHECKING INTEGRITY OF DATA |
| DEVICE TYPE | SHOWS INFORMATION INDICATING WHETHER MOTION DETECTOR IS FOR LEFT HAND OR FOR RIGHT HAND<br>E.G., 1 - LEFT HAND, 2 - RIGHT HAND<br>SHOWS INFORMATION INDICATING STATUS THAT ACCESSORY IS ATTACHED TO MOTION DETECTOR<br>E.G., 1 - 1 - JOYSTICK ACCESSORY ATTACHED TO MOTION DETECTOR FOR LEFT HAND<br>1 - 2 - GUN ACCESSORY ATTACHED TO MOTION DETECTOR FOR LEFT HAND<br>2 - 1 - JOYSTICK ACCESSORY ATTACHED TO MOTION DETECTOR FOR RIGHT HAND<br>2 - 2 - GUN ACCESSORY ATTACHED TO MOTION DETECTOR FOR RIGHT HAND |
| DEVICE STATUS | SHOWS CURRENT STATUS OF MOTION DETECTOR<br>E.G., 1 - DISCONNECTED: CONNECTION IS DISCONNECTED<br>2- CALIBRATING: INITIAL SETTING VALUES ARE BEING CALIBRATED<br>3- DISABLED: CONNECTED, BUT OPERATION IS STOPPED BY USER<br>4- CONNECTED: NORMALLY TRANSMITTING AND RECEIVING DATA |
| MESSAGE TYPE | SHOWS TYPE OF CURRENT MESSGAGE<br>E.G., 1- INFORMATION: DEVICE INFORMATION<br>2- ACTION: INFORMATION REGARDING MOVEMENT OF DEVICE |
| HAND LOCATION INFORMATION | SHOWS RELATIVE LOCATION OF VIRTUAL REALITY PROVIDING DEVICE IN RELATION TO SOURCE AS X-AXIS, Y-AXIS, AND Z-AXIS COORDINATES |
| HAND REVOLUTION INFORMATION | SHOWS RELATIVE REVOLUTION (ZXY REVOLUTIONS) OF VIRTUAL REALITY PROVIDING DEVICE IN RELATION TO SOURCE AS X-AXIS, Y-AXIS, AND Z-AXIS REVOLUTIONS |
| FINGER MOVEMENT INFORMATION | SHOWS BENDING OF RESPECTIVE FINGERS WITH REAL NUMBER VALUES FROM 0 TO 1.<br>E.G., 0 INDICATES STATE THAT FINGER IS FULLY OPENED<br>1- SHOWS INFORMATION REGARDING STATE THAT PHYSICAL BUTTON IS PRESSED |
| BUTTON INFORMATION | SHOWS INFORMATION REGARDING STATE THAT PHYSICAL BUTTON IS PRESSED<br>E.G., 0 INDICATES STATE THAT BUTTON IS NOT PRESSED<br>0.5 - INDICATES STATE THAT BUTTON IS HALF-PRESSED<br>1 - INDICATES STATE THAT BUTTON IS FULLY-PRESSED |
| DATA END | NOTIFIES END OF MESSAGE AND IS USED FOR CHECKING INTEGRITY OF DATA |

ELECTRONIC DEVICE AND METHOD OF CONTROLLING THE SAME

CROSS-REFERENCE TO RELATED APPLICATIONS

This application claims the benefit of U.S. Provisional Application No. 62/387,184, filed on Dec. 24, 2015, in the US Patent Office, the benefit of Korean Patent Application No. 10-2016-0055768, filed on May 4, 2016, and the benefit of Korean Patent Application No. 10-2016-0147636, filed on Nov. 7, 2016 in the Korean Intellectual Property Office, the disclosures of which are incorporated herein in their entireties by reference.

BACKGROUND

1. Field

The present disclosure relates to an electronic device and a method of controlling the same.

2. Description of the Related Art

Recently, apparatuses for providing images to a user via virtual reality devices have been developed. A virtual reality technique is a technique for providing realistic impressions to a user via manipulated sensory stimulation and may be applied to various industrial fields, such as games, education, medical practice, and journalism.

Unlike a conventional flat-panel display apparatus that displays a fixed-size screen image, a user may experience a 360-degree view via a virtual reality device. Therefore, the user may have an immersion feeling as if he/she is in another world. A virtual reality technique increases a user's immersion feeling by providing not only visual and auditory impressions, but also a tactile impression.

SUMMARY

Provided are an electronic device and a method of controlling the same. Furthermore, provided is a non-transitory computer-readable recording medium having recorded thereon a program for implementing the method, by using a computer.

Additional aspects will be set forth in part in the description which follows and, in part, will be apparent from the description, or may be learned by practice of the presented embodiments.

According to an aspect of an embodiment, an electronic device includes a source configured to generate a magnetic field; a motion detector configured to obtain a coordinate of a user's hand based on the generated magnetic field; and a virtual reality providing device configured to reflect the coordinate of the user's hand received from the motion detector in a virtual reality based on a change of a location of the source due to a movement of the user.

According to an aspect of another embodiment, a method of controlling an electronic device, the method includes, based on a magnetic field generated by a source, obtaining a coordinate of a user's hand based on the generated magnetic field; and reflecting the obtained coordinate of the user's hand in a virtual reality based on a change of a location of the source due to a movement of the user.

According to an aspect of another embodiment, a motion detector includes a controller configured to obtain motion data including at least one of information regarding a movement of a user's hand, information regarding type of the motion detector, information regarding type of an accessory coupled with the motion detector, information regarding operation status of the motion detector, and information regarding pressing of button of the motion detector; and a communication interface configured to transmit the obtained motion data to a virtual reality providing device that generates a virtual reality reflecting the movement of the user.

According to an aspect of another embodiment, a motion detector includes a sensor configured to sense a magnetic field; an input unit configured to receive a user input; a controller configured to generate motion data comprising first data based on the sensed magnetic field and second data based on the received user input; and a communication interface configured to transmit the motion data to a virtual reality providing device configured to generate a virtual reality environment.

BRIEF DESCRIPTION OF THE DRAWINGS

These and/or other aspects will become apparent and more readily appreciated from the following description of the embodiments, taken in conjunction with the accompanying drawings in which:

FIG. 13 is a flowchart for describing a method of controlling an electronic device, according to an embodiment;

FIG. 14 is a flowchart for describing a process for providing a virtual reality in the method of controlling the electronic device, according to an embodiment;

FIG. 16 is a diagram for describing fields of motion data generated by the motion detector, according to an embodiment; and FIG. 17 is a diagram for describing fields of motion data generated by the motion detector in detail, according to an embodiment.

DETAILED DESCRIPTION

Hereinafter, the disclosure will be described in detail with reference to the attached drawings. The below embodiments are merely for materialization of the disclosure and do not limit or restrict the scope of the disclosure. Technical features that one of ordinary skill in the art may easily infer from the detailed description and the embodiments below should be understood as falling within the scope of the claims. As used herein, the term "and/or" includes any and all combinations of one or more of the associated listed items. Expressions such as "at least one of," when preceding a list of elements, modify the entire list of elements and do not modify the individual elements of the list.

The use of the terms "a" and "an" and "the" and similar referents in the context of describing the disclosure (especially in the context of the following claims) are to be construed to cover both the singular and the plural. Furthermore, the steps of all methods described herein can be performed in any suitable order unless otherwise indicated herein or otherwise clearly contradicted by context. The disclosure is not limited to the described order of the steps.

It should be noted that references to 'an' or 'one' embodiment herein are not necessarily to the same embodiment, and such references mean at least one.

The disclosure may be described in terms of functional block components and various processing steps. Such functional blocks may be partially or entirely realized by any number of hardware and/or software components configured to perform the specified functions.

Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

Embodiments below relate to an electronic device and a method of controlling the same, wherein descriptions of technical features widely known to one of ordinary skill in the art will be omitted. Hereinafter, the disclosure will be described in detail with reference to the attached drawings.

Figure 1:
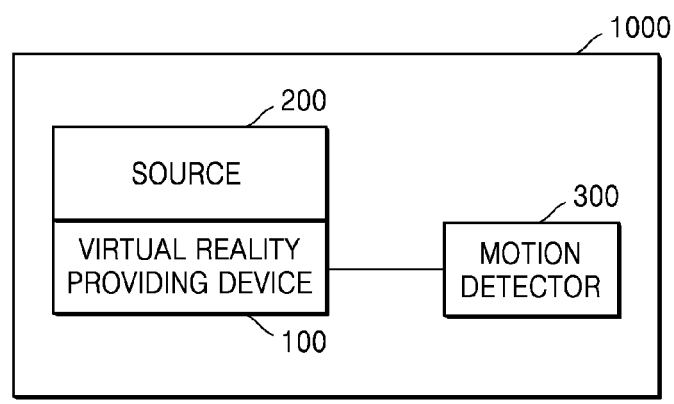
FIG. 1 is a diagram showing a configuration of an electronic device according to an embodiment.

FIG. 1 is a diagram showing a configuration of an electronic device 1000 according to an embodiment. As shown in FIG. 1, the electronic device 1000 may include a virtual reality providing device 100, a source 200, and a motion detector 300.

The source 200 is a device which may generate a magnetic field. The source 200 may be attached to and detached from the virtual reality providing device 100, and the virtual reality providing device 100 may be held or worn by a user. According to the present embodiment, the source 200 may be physically adjacent to the virtual reality providing device 100 by being fixed or attached thereto and may not operate in conjunction with the virtual reality providing device 100. The virtual reality providing device 100 and the motion detector 300 may be connected to each other in a wired or wireless manner through communication interfaces 110 and 310 and exchange data with each other.

According to an embodiment, the source 200 may be included in the virtual reality provisioning device 100, and operations performed by the source 200 may be performed by the virtual reality providing device 100.

According to an embodiment, the source 200 may be attached to and detached from the virtual reality providing device 100. For example, a user may wear the source 200 in the form of a necklace. According to the present embodiment, the source 200 may perform operations to be performed by the virtual reality providing device 100, except a displaying operation. Although the present embodiment is described on the assumption that a user wears the source 200 in the form of a necklace, the present disclosure is not limited thereto, and the source 200 may be positioned at various locations.

According to the present embodiment, the virtual reality providing device 100 and the motion detector 300 are connected to each other via a wireless communication protocol, such as Bluetooth, wherein the initial connection may be established as described below. As the initial connection, the virtual reality providing device 100 may search for surrounding devices via Bluetooth and pair with the motion detector 300 or the virtual reality providing device 100 and the motion detector 300 may be automatically paired when the motion detector 300 is recognized by a particular portion of the virtual reality providing device 100 via a near field communication (NFC) module attached to the motion detector 300. After the initial connection is established, when the virtual reality providing device 100 is operated, the motion detector 300 attempts to establish a connection to the virtual reality providing device 100 every time the motion detector 300 is turned ON, and thus a user may immediately use the motion detector 300.

According to the present embodiment, the virtual reality providing device 100 provides a moving picture or an image regarding a virtual space different from a space in which a user actually is. For example, a user may view a moving picture or an image of a city of a foreign country by using the virtual reality providing device 100 inside a room. For example, while a moving picture is being played, a user may move his or her entire body or may move his or her head only. According to an embodiment, when a user moves his or her entire body, the virtual reality providing device 100 may adjust a size of an image according to a moving direction of the user. Furthermore, according to an embodiment, when a user moves his or her head, the virtual reality providing device 100 may provide different images according to a moving direction or rotating direction of the head of the user.

According to an embodiment, the virtual reality providing device 100 may provide an augmented reality in which a virtual reality environment is overlapped and displayed on a real world in which a user is present. For example, the virtual reality providing device 100 may display an object based on type of an accessory coupled to a motion detector together with an actual hand of a user. For example, if the user is wearing a motion detector coupled with a gun-like accessory in his hand, the virtual reality providing device 100 may provide an augmented reality in which the hand of the actual user holds a gun-like object.

The virtual reality providing device 100 may be a head mounted display (HMD), a virtual reality headset, a virtual reality device, a personal computer (PC), a laptop computer, a smart TV, a smart phone, a personal digital assistant (PDA), a smart terminal, or a game device, but is not limited thereto. Furthermore, the virtual reality providing device 100 may be an eyeglass-type device, a hairband-type device, or a wristwatch-type device with a communication function and a data processing function.

The motion detector 300 may be a handheld device to be handheld and used by a user or a wearable device to be worn in a palm of the user. The motion detector 300 may be configured as a left-hand device or a right-hand device, where a plurality of motion detectors 300 may be individually used or simultaneously used.

Figure 2:
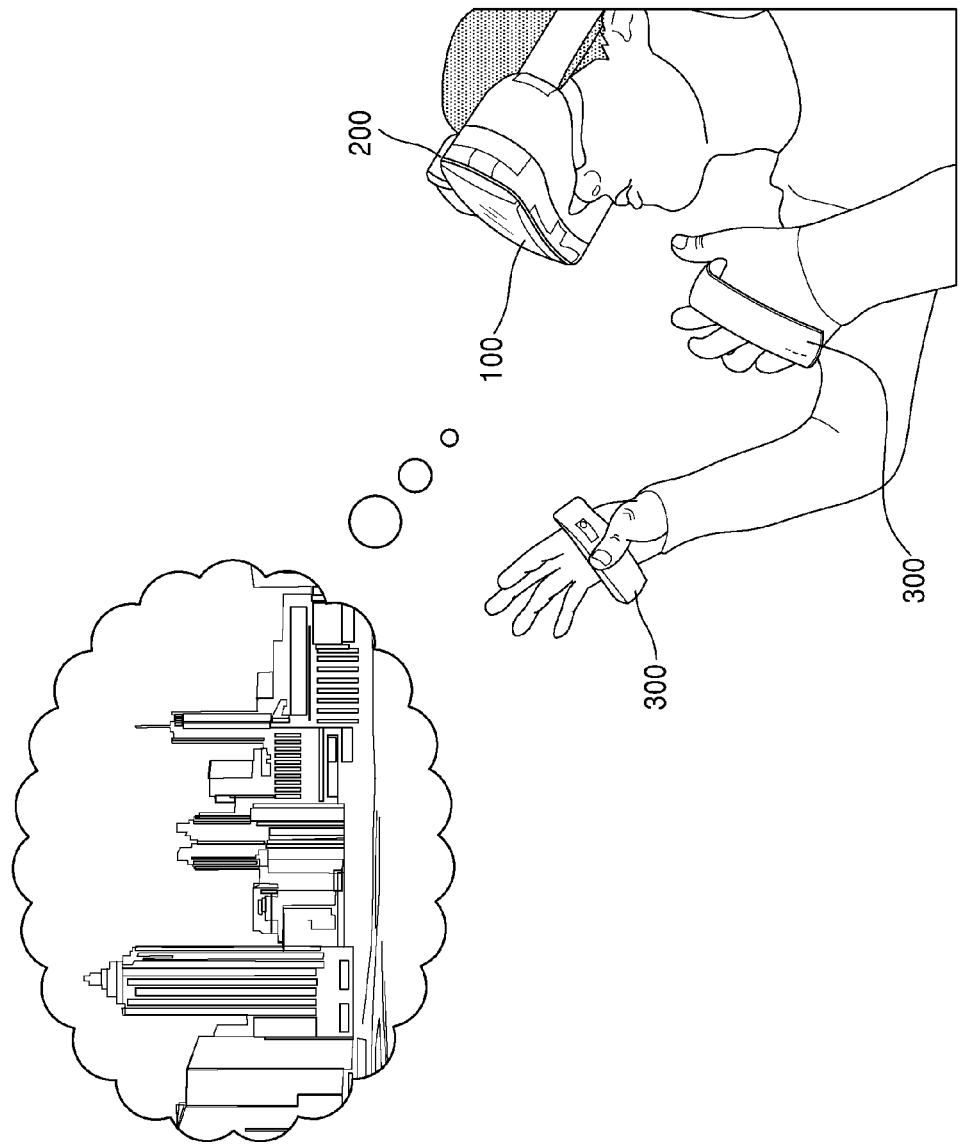
FIG. 2 is a diagram for describing an operation of the virtual reality providing device, according to an embodiment.

FIG. 2 is a diagram for describing an operation of the virtual reality providing device 100 according to an embodiment. Referring to FIG. 2, the virtual reality providing device 100 may be a head-mounting type device for providing 360-degree content to a user, such as a head mounted display (HMD), a virtual reality headset, or a virtual reality device.

According to an embodiment, when a user moves his or her entire body, the virtual reality providing device 100 may adjust a size of a moving picture or an image according to a moving direction of the user. Furthermore, when a user moves his or her head, the virtual reality providing device 100 may display different moving pictures or different images according to a moving direction or rotating direction of the head of the user.

Furthermore, according to an embodiment, in a virtual reality, the virtual reality providing device 100 may display a user interface having a hand-like shape or one of various other shapes together with a moving picture or an image in correspondence to a location and an angle of an actual hand of a user based on content provided by the virtual reality providing device 100 or type of the motion detector 300.

Figure 3:
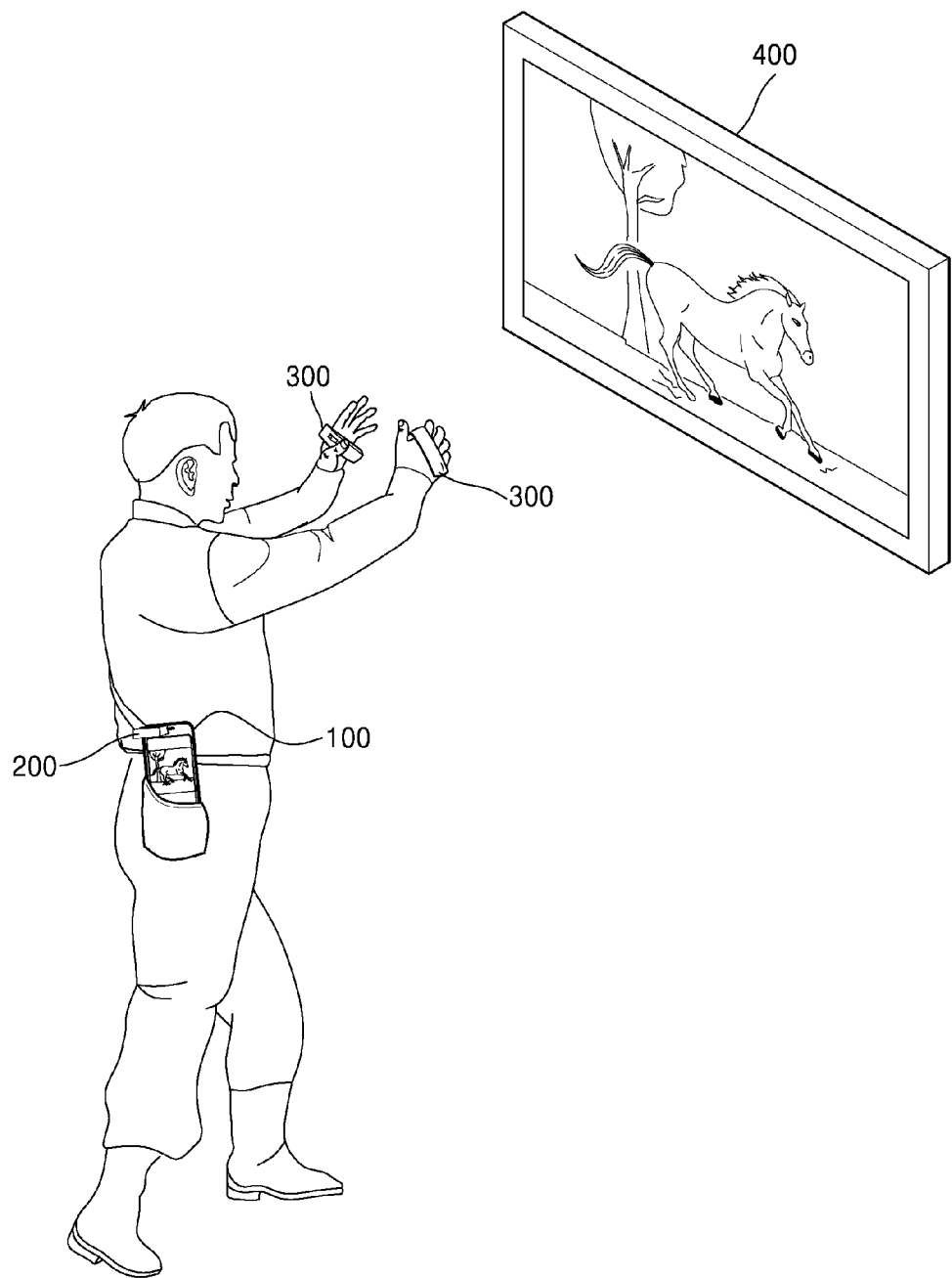
FIG. 3 is a diagram for describing an operation of the electronic device, according to another embodiment.

FIG. 3 is a diagram for describing an operation of the electronic device 1000, according to another embodiment. The virtual reality providing device 100 may be a PC, a laptop computer, a smart TV, a smart terminal, or a game device.

According to an embodiment, the virtual reality providing device 100 may provide virtual reality to the external display apparatus 400, and the virtual reality may be displayed via the external display apparatus 400. The virtual reality providing device 100 may be connected to the external display apparatus 400 via a wired or wireless communication interface 110 and may display a screen image identical to that displayed at the virtual reality providing device 100 at the external display apparatus 400. According to an embodiment, the external display apparatus 400 may be a flat-panel display apparatus or a curved display apparatus, where a virtual reality may not be provided in 360-degrees.

Furthermore, according to an embodiment, the virtual reality providing device 100 may control the external display apparatus 400 to display a user interface having a hand-like shape or one of various other shapes in correspondence to a location and an angle of an actual hand of a user together with a moving picture or an image based on content provided by the virtual reality providing device 100 or type of the motion detector 300.

Figure 4:
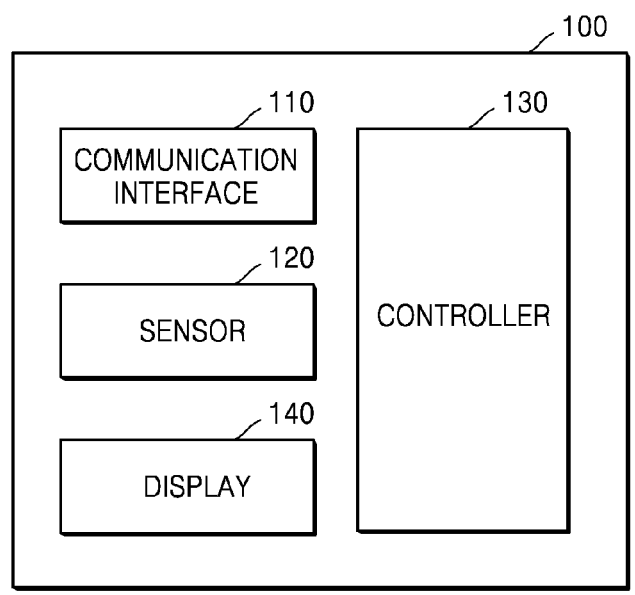
FIG. 4 is a block diagram for describing a configuration of the virtual reality providing device according to an embodiment.

FIG. 4 is a block diagram for describing a configuration of the virtual reality providing device 100 according to an embodiment. As shown in FIG. 4, the virtual reality providing device 100 may include the communication interface 110, a sensor 120, a controller 130, and a display 140.

The communication interface 110 may communicate with various types of external devices via various communication protocols. According to an embodiment, the communication interface 110 may include at least one of various wireless communication chips, such as a Bluetooth chip, a Wi-Fi chip, a mobile communication chip, a ZigBee chip, a NFC chip, and an infrared ray communication chip. For example, the Bluetooth chip and the Wi-Fi chip may perform communications via Bluetooth protocol and Wi-Fi protocol. For example, when the Bluetooth chip or the Wi-Fi chip is used, various connection information, such as a service set identifier (SSID) and a session key, may be transmitted first and, after communication is established by using the information, various information may be transmitted and received.

According to an embodiment, the Bluetooth chip may support short-range wireless communication based on Bluetooth 4.0 (BLE) protocol. The mobile communication chip refers to a chip that performs communication based on various communication standards, such as third generation (3G), third generation partnership project (3GPP), and long-term evolution (LTE). The ZigBee chip supports short-range wireless communication based on one of IEEE 802.15.4 standards and may be used for low-speed data transmission between devices up to about 20 meters apart from each other. The NFC chip refers to a chip that supports short-range wireless communication using 13.56 MHz band from among various RF-ID frequency bands.

Furthermore, via the communication interface 110, the virtual reality providing device 100 may be connected to the motion detector 300 via wire or wirelessly and exchange data. The communication interface 110 may be connected to the motion detector 300 via a network, where the network may be any of networks including a wire network, such as a local area network (LAN), a wide area network (WAN), or a value added network (VAN), a mobile radio communication network, a satellite communication network, etc.

The sensor 120 may detect a movement of a user via sensors and transmit detected information to the controller 130. The sensor 120 may include at least one of a magnetic field sensor, a gyroscope sensor, an acceleration sensor, an optical sensor, a camera sensor, an ultrasound sensor, an infrared ray sensor, a temperature/humidity sensor, a location sensor, a pressure sensor, a proximity sensor, and an illuminance sensor, but is not limited thereto. Since functions of the respective sensors are obvious to one of ordinary skill in the art based on names thereof, detailed descriptions thereof will be omitted.

The controller 130 may control the overall operations of the virtual reality providing device 100. The controller 130 may include at least one processor. According to a function and a role of the controller 130, the controller 130 may include a plurality of processors or a single integrated processor.

The controller 130 may communicate with external devices by using the communication interface 110. Furthermore, when a user manipulates a user interface, the controller 130 may perform a control operation corresponding to the user manipulation.

The controller 130 may include at least one of a random-access memory (RAM), a read-only memory (ROM), a central processing unit (CPU), a graphics processing unit (GPU), and a data bus. The RAM, the ROM, the CPU, and the GPU may be connected to one another via the data bus. The CPU accesses a memory (not shown) and performs a booting operation by using an operating system (OS) stored in the memory. Furthermore, the CPU performs various operations by using various programs, content, and data stored in the memory. The ROM stores a command set for booting the virtual reality providing device 100. For example, when a turn ON command is input and power is supplied to the virtual reality providing device 100, the CPU may copy an OS stored in the memory to the RAM according to a command stored in the ROM and boot the virtual reality providing device 100 by executing the OS. When the booting is completed, the CPU copies various programs stored in the memory (not shown) to the RAM and performs various operations by executing the programs copied to the RAM. When the virtual reality providing device 100 is booted, the GPU displays a screen image on the display 140.

According to the present embodiment, the GPU may generate a screen image having displayed therein an electronic document including various objects, such as content, icons, and menus. The GPU calculates property values, such as coordinates, shapes, sizes, and colors for displaying respective objects, according to layouts of screen images. Next, the GPU may generate screen images of various layouts including objects based on calculated property values. A screen image generated by the GPU may be provided to the display 140 and displayed at respective areas of the display 140.

The memory may store programs for the controller 130 to perform process operations and control operations and may also store data to be input to the virtual reality providing device 100 or data output by the virtual reality providing device 100. The memory may include at least one of a flash memory type memory, a hard disk type memory, a multimedia card micro type memory, a card type memory (e.g., a SD memory or an XD memory), a RAM, a static random access memory (SRAM), a ROM, an electrically erasable/programmable read-only memory (EEPROM), a programmable read-only memory (PROM), a magnetic memory, a magnetic disk, and an optical disc. Programs stored in the memory may be categorized into a plurality of modules based on functions thereof.

The display 140 displays a virtual reality as a virtual reality program is executed and displays virtual reality objects controlled by the controller 130 in the virtual reality. The display 140 may be one of various types of displays, such as a liquid crystal display (LCD), an organic light-emitting diode (OLED) display, an active-matrix organic light-emitting diode (AM-OLED), and a plasma display panel (PDP). The display 140 may be flexible, transparent, and/or wearable.

Names of the above-stated components of the virtual reality providing device 100 may vary. Furthermore, the virtual reality providing device 100 according to an embodiment may include at least one of the above-stated components, some of the above-stated components may be omitted, or the virtual reality providing device 100 according to an embodiment may further include additional components other than the above-stated components. For example, the virtual reality providing device 100 may include the display 140. However, the display 140 may be omitted, and the virtual reality providing device 100 may display a screen image on the external display apparatus 400 via the communication interface 110. In other words, components of the virtual reality providing device 100 may be omitted or added based on types or characteristics of the virtual reality providing device 100.

Figure 5:
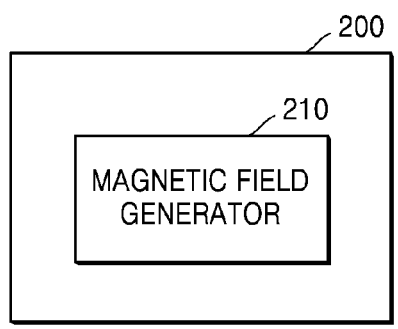
FIG. 5 is a block diagram for describing a configuration of a source according to an embodiment.

FIG. 5 is a block diagram for describing a configuration of the source 200 according to an embodiment. Referring to FIG. 5, the source 200 may include a controller (not shown) and a magnetic field generator 210. The controller may control overall operation of the source 200. The controller may include at least one processor. According to a function and a role of the controller, the controller may include a plurality of processors or a single integrated processor.

According to an embodiment, the controller may control the magnetic field generator 210, and the magnetic field generator 210 may generate a magnetic field by passing current through a 3-axis coil. For example, the magnetic field generator 210 may generate particular AC frequency via a 3-axis coil.

According to an embodiment, operations performed by the source 200 may also be performed by the virtual reality providing device 100, and the operations performed by the virtual reality providing device 100 as described above with reference to FIG. 4 may also be performed by the source 200.

According to an embodiment, the source 200 may be attached to and detached from the virtual reality providing device 100 and a user may wear or position the source 200 in various forms, such as necklaces, bracelets, braces, belts. However, the present disclosure is not limited thereto. For example, a user may wear the source 200 in the form of a necklace. In this case, the source 200 may include a communication interface (not shown) and a sensor (not shown) other than the magnetic field generator 210 and the controller and may perform operations to be performed by the virtual reality providing device 100, except for an operation of displaying a virtual reality. For example, the source 200 may receive coordinates of a hand from the motion detector 300 and correct it in correspondence to a movement of the user.

Names of the above-stated components of the source 200 may vary. Furthermore, the source 200 according to an embodiment may include at least one of the above-stated components, some of the above-stated components may be omitted, or the source 200 according to an embodiment may further include additional components other than the above-stated components.

Figure 6:
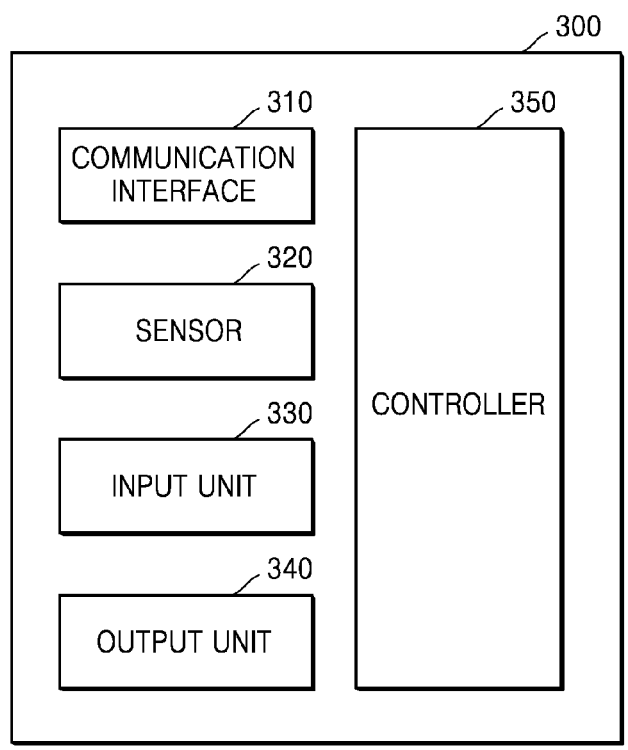
FIG. 6 is a block diagram for describing a configuration of a motion detector according to an embodiment.

FIG. 6 is a block diagram for describing a configuration of the motion detector 300 according to an embodiment.

As shown in FIG. 6, the motion detector 300 may include a communication interface 310, a sensor 320, an input unit 330, an output unit 340, and a controller 350. However, not all of the components shown in FIG. 6 are essential components of the electronic device 1000. The electronic device 1000 may be implemented by more components than the components shown in FIG. 6 or the electronic device 1000 may be implemented by fewer components than those shown in FIG. 6.

For example, the motion detector 300 according to an embodiment may include only the communication interface 310 and the controller 350. In another example, the motion detector 300 according to another embodiment may include the communication interface 310, the sensor 320, the input unit 330, and the controller 350.

The communication interface 310 may communicate with various types of external devices via various communication protocols. According to an embodiment, the communication interface 310 may transmit motion data to a virtual reality providing device that generates a virtual reality. The communication interface 310 may include at least one of various wireless communication chips, such as a Bluetooth chip, a Wi-Fi chip, a mobile communication chip, a ZigBee chip, a NFC chip, and an infrared ray communication chip. The Bluetooth chip and the Wi-Fi chip may respectively perform communication via the Bluetooth protocol and the Wi-Fi protocol. When the Bluetooth chip or the Wi-Fi chip is used, various connection information, such as a SSID and a session key, may be transmitted first and, after communication is established by using the information, various information may be transmitted and received.

According to an embodiment, the Bluetooth chip may support short-range wireless communication based on Bluetooth 4.0 (BLE) protocol. The mobile communication chip refers to a chip that performs communication based on various communication standards, such as third generation (3G), third generation partnership project (3GPP), and long-term evolution (LTE). The ZigBee chip supports short-range wireless communication based on one of IEEE 802.15.4 standards and may be used for low-speed data transmission between devices up to about 20 meters apart from each other. The NFC chip refers to a chip that supports short-range wireless communication using a 13.56 MHz band from among various RF-ID frequency bands.

According to an embodiment, via the communication interface 310, the motion detector 300 may be connected to the virtual reality providing device 100 via wire or wirelessly and exchange data. For example, the communication interface 310 may be connected to the motion detector 300 via a network, where the network may be any of networks including a wired network, such as a local area network (LAN), a wide area network (WAN), or a value added network (VAN), a mobile radio communication network, a satellite communication network, etc.

According to an embodiment, the communication interface 310 may include a proximity communication module for initial location correction. For example, the proximity communication module may include a communication module, such as a NFC module, an infrared ray communication module, and an ultrasound communication module. For example, when the motion detector 300 is located within a certain distance from the source 200 or the virtual reality providing device 100, the proximity communication module may detect the approach of the motion detector 300 and an initial location correcting command may be applied to the controller 350.

The sensor 320 according to an embodiment may detect a movement of a user via sensors and transmit detected information to the controller 350. The sensor 320 may include at least one of a magnetic field sensor, a gyroscope sensor, an acceleration sensor, an optical sensor, a camera sensor, an ultrasound sensor, an infrared ray sensor, a temperature/humidity sensor, a location sensor, an atmospheric pressure sensor, a proximity sensor, and an illuminance sensor, but is not limited thereto For example, the sensor 320 may sense a magnetic field via a magnetic field sensor.

For example, the motion detector 300 may user a magnetic field sensor to recognize intensity of a current induced to a 3-axis coil by a magnetic field generated by the magnetic field generator 210 of the source 200, thereby detecting a movement of a user. Examples of the magnetic field sensor may include a 3-axis coil, an amplifier, an analog to digital converter (ADC), a band pass filter, etc.

According to the present embodiment, the motion detector 300 may obtain finger movement information via the sensor 320. According to an embodiment, a proximity sensor refers to a sensor that detects existence of an object approaching toward a certain detection surface or existence of a nearby object via an electromagnetic field or an infrared ray without a mechanical contact and may be used for initial location correction as described above. According to an embodiment, results detected by the sensor 320 may be transmitted to the controller 350. Since functions of the respective sensors are obvious to one of ordinary skill in the art based on names of the respective sensors, detailed description thereof will be omitted.

The input unit 330 may receive a certain signal input from outside or by a user. According to an embodiment, the input unit 330 may include a button, a keypad, a dome switch, a touchpad (a contact-type capacitance method, a pressure-type resistance film method, an infrared sensing method, a surface ultrasound transmission method, an integral tension measuring method, a piezo effect method, and the like), a jog wheel, and a jog switch, but is not limited thereto. The input unit 330 according to an embodiment may receive a user input. For example, a button may transmit a user input to the controller 350 based on information indicating pressed/non-pressed state of a physical button.

The output unit 340 may be used to output a generated signal to outside. For example, the output unit 340 may include a vibrating actuator, an audio output unit, an illumination unit, etc. The output unit 340 may output audio data received via the communication interface 310 or stored in a memory. Furthermore, the output unit 340 may output an acoustic signal related to a function (e.g., a notification sound) performed by the motion detector 300. The output unit 340 may include a speaker, a buzzer, etc.

The vibrating actuator may output a vibration signal. For example, the vibration actuator may output a vibration signal corresponding to output of audio data or video data. For example, the vibrating actuator may generate vibration according to a control signal of the controller 350, and the speaker may output sound waves including data to outside. The illumination unit may emit light. For example, the illumination unit may include a light-emitting device, such as a LED, and may transmit data via flicker of light.

The controller 350 may control overall operation of the motion detector 300. The controller 350 may include at least one processor. According to a function and a role of the controller 350, the controller 350 may include a plurality of processors or a single integrated processor.

According to an embodiment, the controller 350 may generate motion data including first data based on a magnetic field and second data based on a user input. Detailed description of the motion data will be given below with reference to FIGS. 16 and 17.

Furthermore, the controller 350, according to an embodiment, may perform communications with external devices via the communication interface 310. The controller 350 may output a certain signal to outside via an output unit 150 or receive a certain signal from outside via an input unit 160. According to an embodiment, the controller 350 receives detected data from the sensor 320, obtains signal values for respective axes, and calculates coordinates indicating a location and a direction of a hand.

According to an embodiment, the controller 350 may calculate magnetic field vectors at respective locations by using the origin of a 3-axis magnetic field generated by the source 200 and nine values measured by the sensor 320 of the motion detector 300 regarding the origin of the magnetic field, calculate a location and a revolution of the motion detector 300 according to a magnetic field equation, and transmit a result of the calculation to the virtual reality providing device 100 via the communication interface 310.

Figure 7:
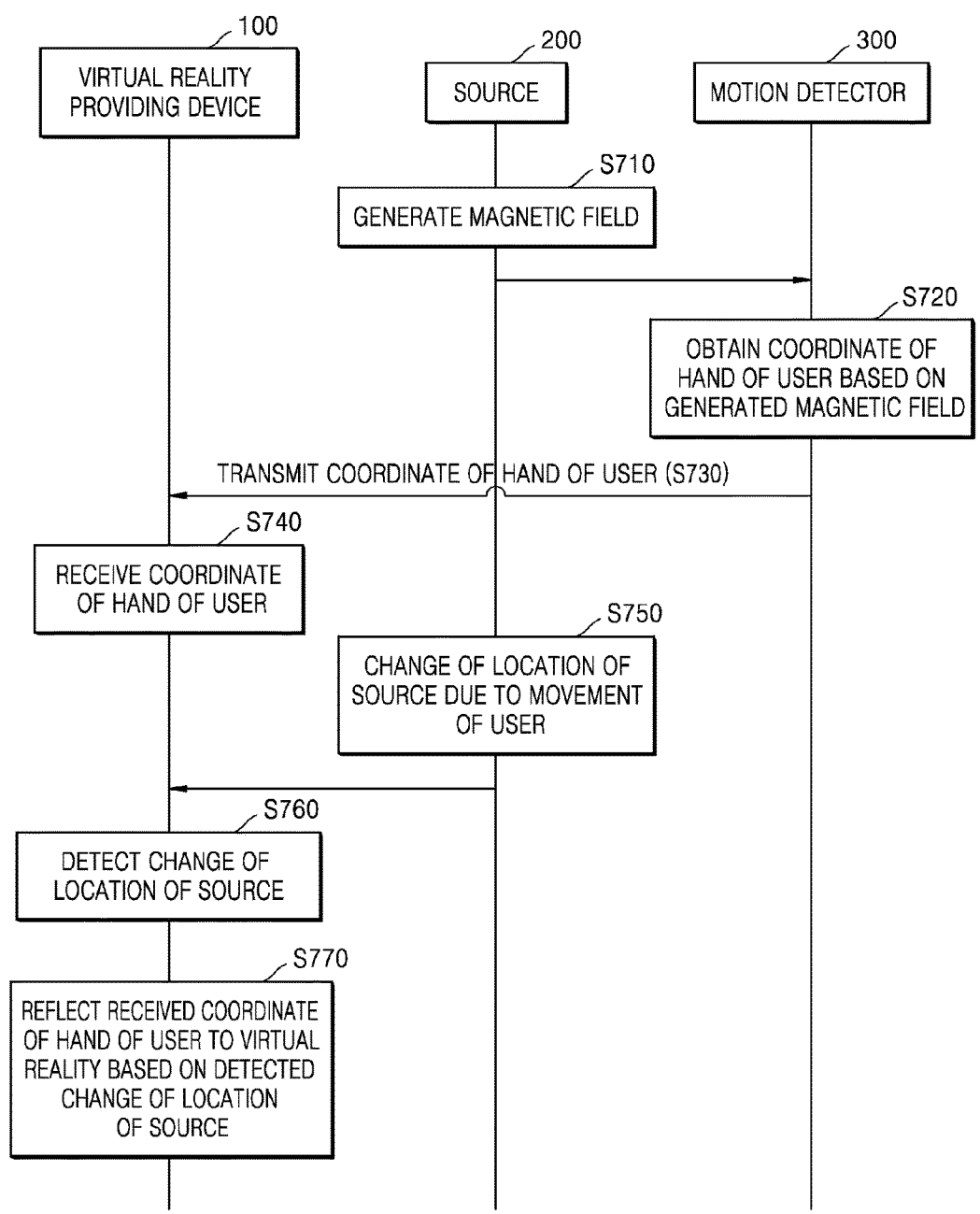
FIG. 7 is a diagram for describing a method of controlling the electronic device, according to an embodiment.
Figure 8:
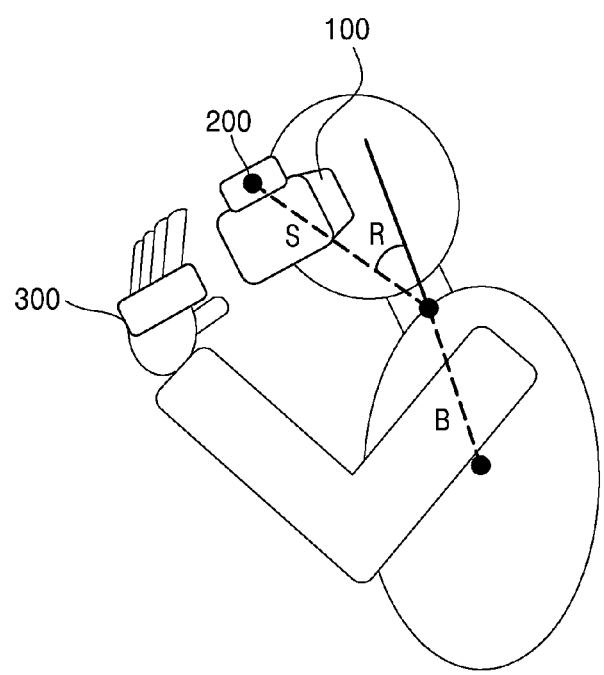
FIG. 8 is a diagram for describing a calculation for correcting a movement of a head of a user, according to a change of location of the source.

According to an embodiment, the controller 350 may generate data shown in FIGS. 7 and 8 by using values measured by the sensor 320. For example, the data shown in FIGS. 7 and 8 may be generated according to the Bluetooth communication specification.

According to an embodiment, the controller 350 controls the output unit 340 to express suitable feedback based on a user input or content. For example, when an object overlaps a user interface corresponding to a user's hand in a virtual reality within a pre-set range, vibration may be generated by the vibrating actuator of the output unit 340. Furthermore, the controller 350 may include at least one of a RAM, a ROM, a CPU, a GPU, and a data bus. The RAM, the ROM, the CPU, and the GPU may be connected to one another via the data bus.

Names of the above-stated components of the motion detector 300 may vary. Furthermore, the motion detector 300 according to an embodiment may include at least one of the above-stated components, some of the above-stated components may be omitted, or the motion detector 300 according to an embodiment may further include additional components other than the above-stated components.

FIG. 7 is a diagram for describing a method of controlling the electronic device 1000 according to an embodiment. Referring to FIG. 7, a process for transmitting data between the virtual reality providing device 100, the source 200, and the motion detector 300 will be described below.

In operation S710, the source 200 may generate a magnetic field.

In operation S720, the motion detector 300 may obtain coordinates of a user's hand based on the magnetic field.

According to an embodiment, since the motion detector 300 may detect a magnetic field by using at least one sensor, a location and a direction of a user's hand may be calculated based on the intensity of a magnetic field generated by the source 200 and a relative coordinate of the user's hand with respect to the source 200 is obtained.

In operation S730, the motion detector 300 may transmit the obtained coordinate of the user's hand to the virtual reality providing device 100.

In operation S740, the virtual reality providing device 100 may receive the coordinate of the user's hand from the motion detector 300.

For example, the motion detector 300 may transmit and receive coordinates of the user's hand to and from the virtual reality providing device 100 via a network. Here, the network may be implemented by a wireless communication technology, such as wireless fidelity (Wi-Fi), home RF, Bluetooth, HR WPAN, UWB, LR WPAN, IEEE 1394, etc. or a mobile communication technology, but are not limited thereto.

In operation S750, location of the source 200 may be changed according to a movement of a user. According to an embodiment, since the source 200 may be attached to the virtual reality providing device 100 and the user may carry or wear the virtual reality providing device 100, when the user moves, not only may the location of the virtual reality providing device 100 be changed, but also the location of the source 200.

In operation S760, the virtual reality providing device 100 may detect a change of location of the source 200 based on a movement of the user via the sensor 320. According to an embodiment, since the coordinates of the hand obtained in operation S720 are coordinates of the user's hand in relation to the source 200, it is necessary to re-calculate coordinates of the user's hand by reflecting changes of location and angle of the source 200 detected via at least one sensor of the virtual reality providing device 100.

In operation S770, the coordinate of the user's hand received from the motion detector 300 may be reflected to a virtual reality based on the detected change of location of the source 200. A method of reflecting coordinates of a user's hand based on change of location of the source 200 to a virtual reality will be described below in detail.

According to the present embodiment, based on a change of location of the source 200 due to a movement of a user, coordinates of the user's hand related to the source 200 may be corrected based on a portion of the body of the user, and the corrected coordinate of the user's hand may be reflected to a virtual reality. Since the correction of the coordinates of the user's hand is made to correct a change of location of the source 200 according to a movement of the user, the portion of the body of the user may be a portion that is less affected by a movement of the user.

According to an embodiment in which the virtual reality providing device 100 is a VR headset, since the source 200 may be attached to the virtual reality providing device 100 and the user may wear the virtual reality providing device 100 on his or her head, when the user moves his or her head, not only location of the virtual reality providing device 100 may be changed, but also location of the source 200 may be changed. Therefore, according to an embodiment, based on the change of the location of the source 200 due to the movement of the head of the user, the coordinates of the user's hand in relation to the source 200 may be corrected by using the chest of the user, which is a portion that is less affected by a movement of the user, as a reference point, and the corrected coordinate of the user's hand may be reflected to a virtual reality.

FIG. 8 is a diagram for describing a calculation for correcting a movement of the head of a user according to a change of location of the source 200.

Referring to FIG. 8, according to an embodiment, an example matrix calculation for obtaining an actual coordinate of a user's hand by correcting a coordinate of the user's hand, which is obtained by the motion detector 300 in relation to the source 200, by using the chest of the user as a reference point based on a change of location of the source 200 due to a movement of the head of the user is shown.

According to an embodiment, based on a magnetic field generated by the source 200, the motion detector 300 measures intensity of an induced current and calculates location of the motion detector 300 in relation to the source 200 and tilting angles of the x-axis, the y-axis, and the z-axis. A location and tilting angles of an actual hand may be calculated by reflecting a tilting angle of the virtual reality providing device 100 and a movement of a neck joint to the relative location to a location and a tilting angle of the motion detector 300 in relation to the source 200. Detailed description thereof will be given below.

According to an embodiment, since the source 200 may be attached to the virtual reality providing device 100, the source 200 may have different coordinates according to a direction of the head of a user even if the location of the user's hand is not changed. The reason for this is that, when the virtual reality providing device 100 is attached to the head of the user, the reference coordinate system of the source 200, which is the reference for determining locations, revolves as the head of the user revolves. According to an embodiment, data regarding location and revolution detected by at least one sensor of the motion detector 300 becomes a local coordinate related to the source 200. In order to calculate absolute coordinates of a hand in an actual user space, it is necessary to correct a movement of the source 200 with respect to coordinates obtained by using data detected by the at least one sensor of the motion detector 300.

According to an embodiment, revolution of the source 200 may be corrected by taking a tilting angle of the source 200 and a movement of the head of a human into account. For example, since the head of a user revolves around a neck joint, correction of location of the source 200 may be calculated based on a movement from the neck joint to the location of the source 200 and a revolution of the source 200.

According to an embodiment, since revolution of the source 200 attached to the virtual reality providing device 100 is identical to revolution of the virtual reality providing device 100, a revolution of the virtual reality providing device 100 detected by a sensor of the virtual reality providing device 100 may be applied, where a location of the source 200 with respect to the neck joint may be obtained via a calibration.

Since the present embodiment provides coordinates system based on location of the chest of a user, respective parameters are defined as described below, where a calculation sequence as described below is applied.

Input P': a relative location of a motion detector in coordinates system based on a source Input R': a relative revolution of the motion detector in the coordinate system based on the source S: calculation regarding a movement from a virtual reality providing apparatus to the neck joint R: calculation regarding a revolution of the virtual reality providing apparatus B: calculation regarding a movement from the neck joint to the chest (the final reference coordinate system)

Final Location $P=B*R*S*\text{Input } P'$

Final Angle $R=R*\text{Input } R'$

Final Location $Pc=\text{Input } P'*S*R*B$

Final Angle $Rc=\text{Input } R'*R$

Measured values according to an embodiment are as shown below.

It is assumed that a current relative location input P' from the source 200 measured by the motion detector 300 is X=30 cm, Y=0 cm, and Z=100 cm, where the input P' is transformed to a matrix according to Equation 1.

$$\text{Input } P' = (0.3, 0, 1) \rightarrow \begin{bmatrix} 0.3 \\ 0 \\ 1 \\ 1 \end{bmatrix} \quad [\text{Equation 1}]$$

When it is assumed that the length of the face of a user is about 30 cm and the head of the user is located forward of the neck by about 10 cm, the calculation S regarding a movement from the virtual reality providing device 100 to the neck joint and the calculation regarding a revolution of the virtual reality providing device 100 based on a revolution of the neck joint are determined according to Equations 2 and 3. Here, the calculation R is expressed as an Euler angle. The calculation R may utilize data detected by a sensor of the virtual reality providing device 100.

$$S = (0, 0.3, 0.1) \rightarrow \begin{bmatrix} 1 & 0 & 0 & 0 \\ 0 & 1 & 0 & 0.3 \\ 0 & 0 & 1 & 0.1 \\ 0 & 0 & 0 & 1 \end{bmatrix} \quad [\text{Equation 2}]$$

$$R = (\pi/6, 0, 0) \rightarrow \begin{bmatrix} 1 & 0 & 0 & 0 \\ 0 & 0.86603 & -0.5 & 0 \\ 0 & 0.5 & 0.86603 & 0 \\ 0 & 0 & 0 & 1 \end{bmatrix} \quad [\text{Equation 3}]$$

Since the chest is used as a reference point, a calculation regarding a movement from the neck joint to the chest (the final reference coordinate system) is determined according to Equation 4.

$$B = (0, 0.5, 0) \rightarrow \begin{bmatrix} 1 & 0 & 0 & 0 \\ 0 & 1 & 0 & 0.5 \\ 0 & 0 & 1 & 0 \\ 0 & 0 & 0 & 1 \end{bmatrix} \quad [\text{Equation 4}]$$

A location of the motion detector 300 obtained by correcting a movement of the head of the user by using the chest as a reference point is determined based on a matrix calculation according to Equation 5.

$$\text{final location } P = BRS\text{Input } P' = \quad [\text{Equation 5}]$$

$$\begin{bmatrix} 1 & 0 & 0 & 0 \\ 0 & 1 & 0 & 0.5 \\ 0 & 0 & 1 & 0 \\ 0 & 0 & 0 & 1 \end{bmatrix} \begin{bmatrix} 1 & 0 & 0 & 0 \\ 0 & 0.86603 & -0.5 & 0 \\ 0 & 0.5 & 0.86603 & 0 \\ 0 & 0 & 0 & 1 \end{bmatrix} \begin{bmatrix} 1 & 0 & 0 & 0 \\ 0 & 1 & 0 & 0.3 \\ 0 & 0 & 1 & 0.1 \\ 0 & 0 & 0 & 1 \end{bmatrix} \begin{bmatrix} 0.3 \\ 0 \\ 1 \\ 1 \end{bmatrix} =$$

$$\begin{bmatrix} 0.3 \\ 0.20981 \\ 1.10263 \\ 1 \end{bmatrix}$$

When the final location P is transformed to a vector, the final location Pc is obtained.

final location $Pc=(0.3, 0.21, 1.1)$

Therefore, the finally corrected location of the motion detector 300 is X=0.3 cm, Y=0.21 cm, and Z=1.1 cm.

It is assumed that the current relative revolution input R' from the source 200 measured by the motion detector 300 is ($\pi/6$, 0, $\pi/6$) and the input R' is transformed to a matrix according to Equation 6.

$$\text{input } R' = \quad [\text{Equation 6}]$$

$$(\pi/6, 0, \pi/6,) \rightarrow \begin{bmatrix} 0.86603 & -0.5 & 0 & 0 \\ 0.43301 & 0.75 & -0.5 & 0 \\ 0.25 & 0.43301 & 0.86603 & 0 \\ 0 & 0 & 0 & 1 \end{bmatrix}$$

A revolution of the motion detector 300 obtained by correcting a movement of the head of the user by using the chest as a reference point is determined based on a matrix calculation according to Equation 7.

$$\text{Final Angle } R = R \text{ Input } R' = \quad [\text{Equation 7}]$$

$$\begin{bmatrix} 1 & 0 & 0 & 0 \\ 0 & 0.86603 & -0.5 & 0 \\ 0 & 0.5 & 0.86603 & 0 \\ 0 & 0 & 0 & 1 \end{bmatrix} \begin{bmatrix} 0.86603 & -0.5 & 0 & 0 \\ 0.43301 & 0.75 & -0.5 & 0 \\ 0.25 & 0.43301 & 0.86603 & 0 \\ 0 & 0 & 0 & 1 \end{bmatrix} =$$

$$\begin{bmatrix} 0.86603 & -0.5 & 0 & 0 \\ 0.25 & 0.43301 & -0.86603 & 0 \\ 0.43301 & 0.75 & 0.5 & 0 \\ 0 & 0 & 0 & 1 \end{bmatrix}$$

When the final location R is transformed to a vector, the final location Pc is obtained.

final angle $Rc=(\pi/3, 0, \pi/6)$

Therefore, the finally corrected angle of the motion detector 300 is ($\pi/3$, 0, $\pi/6$).

Absolute coordinates, such as the final location Pc=(0.3, 0.21, 1.1) and the final angle Rc=($\pi/3$, 0, $\pi/6$) regarding the user's hand based on the chest of the user as a reference point, may be obtained based on matrix calculations as exemplified in Equations 1 through 7.

The matrix operations as shown in Equations 1 through 7 are merely embodiments for correcting coordinates of a user's hand derived by the motion detector 300 with respect to a movement of the user and are not limited thereto. Furthermore, according to an embodiment, coordinates of a user's hand, which is corrected with a movement of the user, may be obtained by using sensor data without using a part of the body of the user including the user's chest as a reference point.

Figure 9:
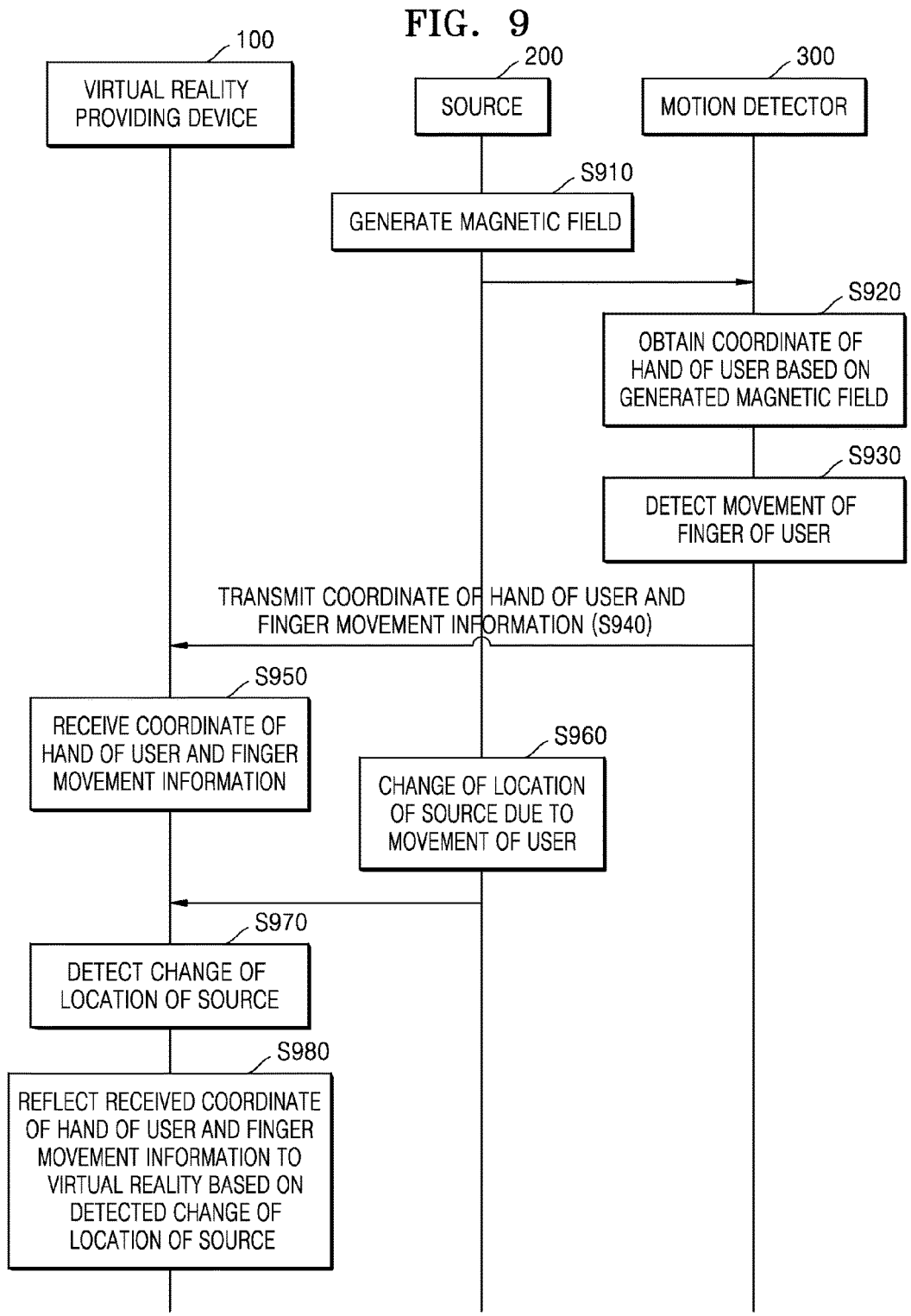
FIG. 9 is a diagram for describing a method of controlling the electronic device that reflects finger movement information, according to an embodiment.

FIG. 9 is a diagram for describing a method of controlling the electronic device 1000 that reflects finger movement information, according to an embodiment. Referring to FIG. 9, a process for transmitting data between the virtual reality providing device 100, the source 200, and the motion detector 300 will be described.

In operation S910, the source 200 may generate a magnetic field.

In operation S920, the motion detector 300 may obtain coordinates of a user's hand based on the magnetic field generated by the source 200. According to an embodiment, since the motion detector 300 may detect a magnetic field via at least one sensor, a location and a direction of the user's hand may be calculated based on the intensity of the magnetic field generated by the source 200, and thus a relative coordinate of the user's hand in relation to the source 200 may be obtained.

In operation S930, the motion detector 300 may detect a movement of a finger of the user. According to an embodiment, the motion detector 300 may use a magnetic field sensor for detecting location and revolution of a user's hand based on the magnetic field generated by the source 200 and may use an optical sensor (e.g., an infrared ray (IR) sensor) for detecting a movement of a finger.

In operation S940, the motion detector 300 may transmit coordinates of the user's hand and finger movement information to the virtual reality providing device 100.

In operation S950, the virtual reality providing device 100 may receive coordinates of the user's hand and the finger movement information in relation to the source 200 from the motion detector 300. For example, the motion detector 300 may transmit and receive coordinates of the user's hand and the finger movement information to and from the virtual reality providing device 100 via a network. Here, the network may be implemented by a wireless communication technology, such as wireless fidelity (Wi-Fi), home RF, Bluetooth, HR WPAN, UWB, LR WPAN, IEEE 1394, etc. or a mobile communication technology, but are not limited thereto.

In operation S960, location of the source 200 may be changed according to a movement of a user. According to an embodiment, since the source 200 may be attached to the virtual reality providing device 100 and the user may wear the virtual reality providing device 100, when the user moves, not only location of the virtual reality providing device 100 may be changed, but also location of the source 200 may be changed.

In operation S970, the virtual reality providing device 100 may detect a change of location of the source 200. According to an embodiment, since the coordinates of the hand obtained in operation S920 are coordinates of the user's hand in relation to the source 200, it is necessary to re-calculate coordinates of the user's hand by reflecting changes of location and angle of the source 200 detected via at least one sensor of the virtual reality providing device 100.

In operation S980, the coordinate of the user's hand received from the motion detector 300 may be reflected to a virtual reality based on the detected change of the location of the source 200, where finger movement information may also be reflected to the virtual reality.

According to an embodiment, the coordinates of the user's hand in relation to the source 200 received from the motion detector 300 may be corrected by reflecting a change of location of the source 200. Furthermore, according to an embodiment, a hand-shaped UI corresponding to an actual hand may be reflected to a virtual reality by using location information regarding the user's hand, the rotation information, shape of the hand, and information regarding bending of respective fingers. According to another embodiment, according to type of an accessory attached to the motion detector 300, a specialized UI or GUI may be reflected to a virtual reality. Detailed description thereof will be given below with reference to FIG. 14.

According to the present embodiment, information transmitted by the motion detector 300 to the virtual reality providing device 100 may include not only coordinates of a user's hand and finger movement information, but also motion data to be described below with reference to FIGS. 16 and 17.

Figure 10:
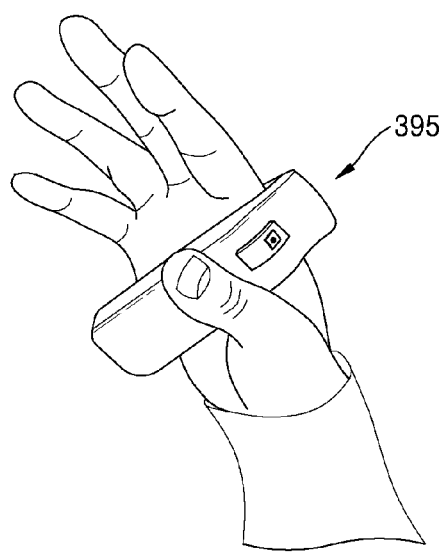
FIG. 10 is a diagram for describing a shape of the motion detector, according to an embodiment.

FIG. 10 is a diagram for describing shape of the motion detector 300 according to an embodiment.

According to an embodiment, the motion detector 300 may include a housing 395 having a curved portion. Therefore, according to an embodiment, the curved portion of the motion detector 300 may be mounted on a portion of a user's hand. According to an embodiment, the curved portion of the motion detector 300 may be the center portion, the upper portion, or the lower portion of the motion detector 300, but is not limited thereto. Alternatively, the motion detector 300 may include a flexible housing 395 that may be curved in correspondence to shapes of hands of users.

Furthermore, according to embodiments, the motion detector 300 may be either partially curved or entirely curved. Furthermore, a portion of or the entire motion detector 300 may be mounted on one of various portions of a user's hand, e.g., the back of the hand, the palm, a finger, a portion between the palm and the back of the hand, a side of the hand, etc. For example, as shown in FIG. 10, the U-shaped motion detector 300 may include a bent housing 395 at the center to be mounted between a user's thumb and index finger, and thus the user's fingers may be moved freely. Furthermore, according to an embodiment, the housing 395 and a mounting location for the right-handed motion detector 300 may be different from the housing 395 and a mounting location for the left-handed motion detector 300.

Figure 11:
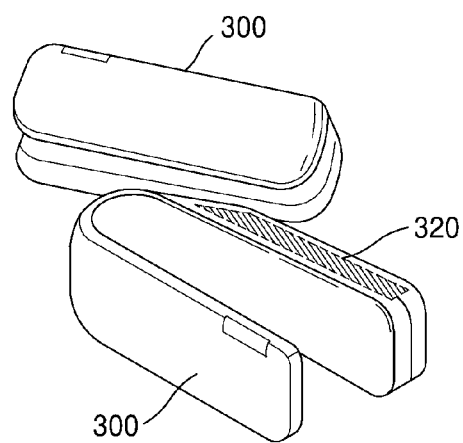
FIG. 11 is a diagram for describing arrangement of a sensor of the motion detector, according to an embodiment.

FIG. 11 is a diagram for describing arrangement of the sensor 320 of the motion detector 300 according to an embodiment.

Referring to FIG. 11, the at least one sensor 320 of the motion detector 300 for detecting a finger movement of a user may be located on at least one side of the motion detector 300. According to an embodiment, the sensor 320 may include at least one of a magnetic field sensor, a gyroscope sensor, a acceleration sensor, a temperature/humidity sensor, a location sensor, a pressure sensor, a proximity sensor, a illuminance sensor, a optical sensor, a camera sensor, a ultrasound sensor, and a infrared ray sensor, but is not limited thereto.

According to the present embodiment, in order to detect a degree that a finger is bent, the sensor 320 may be arranged on a side of the motion detector 300 nearby the palm. According to embodiments, the sensor 320 may be located on the front surface, the rear surface, an upper surface, a lower surface, a side surface, or all surfaces of the motion detector 300, but locations of the sensor 320 are not limited thereto. According to an embodiment, at least one sensor of the sensor 320 may be located on a first side of the motion detector 300, whereas at least one other sensor of the sensor 320 may be located on a second side of the motion detector 300. For example, an IR sensor may be located on the first side close to the palm of a hand, whereas other sensors may be located on the second side closed to the back of the hand. Furthermore, according to an embodiment, at least one sensor of the sensor 320 may be linearly located. According to an embodiment, not only a location of a user's hand, but also information including a shape of the user's hand, degrees that respective fingers are bent, an angle of the user's hand, and a revolution of the user's hand may be obtained, and thus a hand-shaped UI that is identical to or corresponds to an actual shape of the user's hand may be reflected to a virtual reality.

Figure 12A:
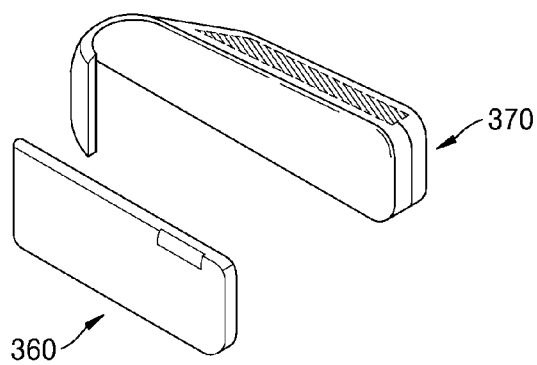
FIGS. 12A through 12D are diagrams for describing accessories that may be coupled with a motion detector according to various embodiments.
Figure 12B:
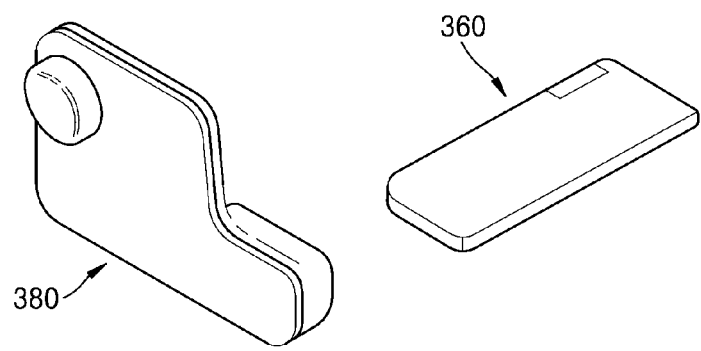
Figure 12C:
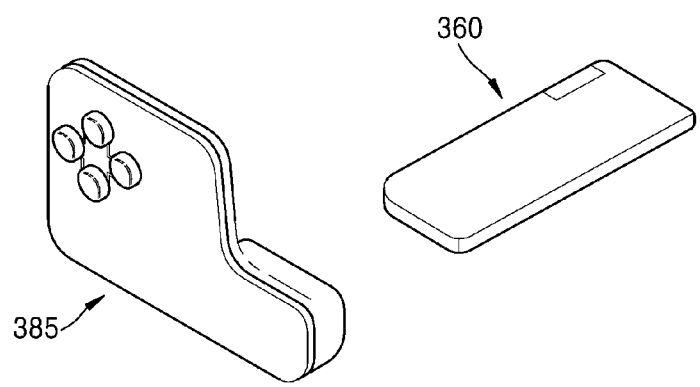
Figure 12D:
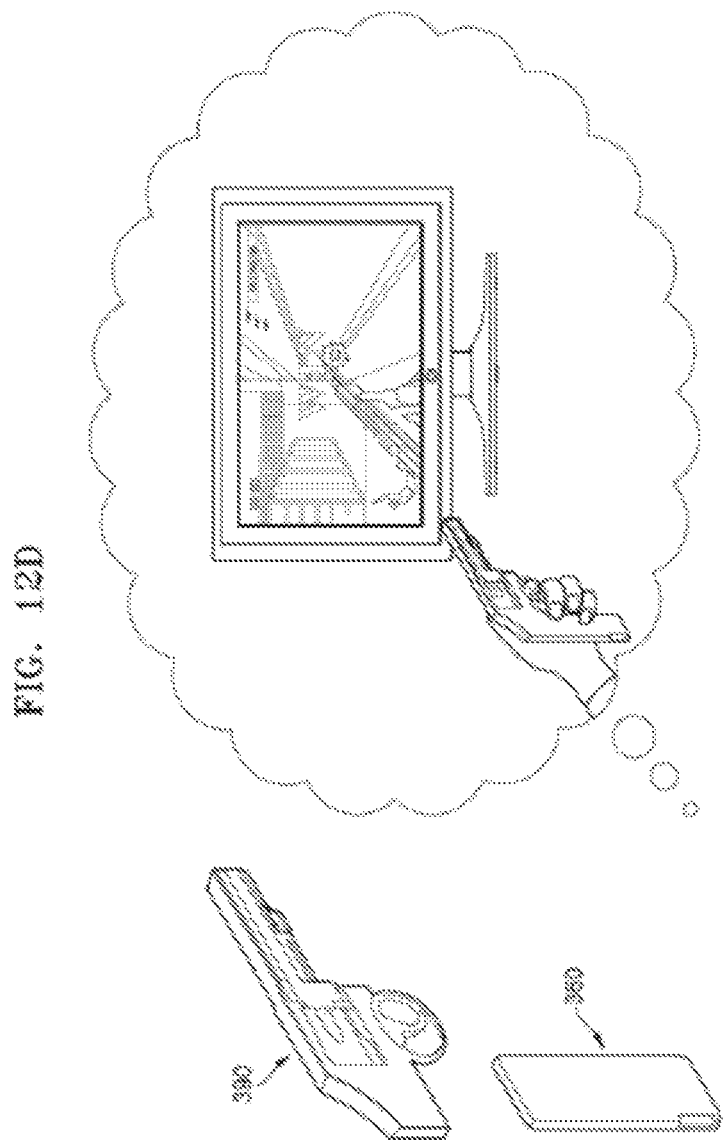

FIGS. 12A through 12D are diagrams for describing accessories that may be coupled with the motion detector 300 according to various embodiments. As shown in FIGS. 12B through 12D, accessories that can be manipulated in various ways may be coupled with a portion of the motion detector 300.

Referring to FIG. 12A, the motion detector 300 according to an embodiment may include a housing that may be split into two portions. According to an embodiment, a first portion 360 of the motion detector 300 may include some of the components of the motion detector 300, whereas a second portion 370 of the motion detector 300 may include the remaining components of the motion detector 300. According to an embodiment, the first portion 360 of the motion detector 300 may include a communication interface and a controller, whereas the second portion 370 of the motion detector 300 may include an input unit and a sensor. For example, the first portion 360 of the motion detector 300 may include a communication interface, an input unit, an output unit, a controller, and a plurality of sensors, whereas the second portion 370 of the motion detector 300 may include an input unit and an IR sensor.

As shown in FIGS. 12B through 12D, according to an embodiment, the second portion 370 of the motion detector 300 may be replaced with a separate coupleable accessory. For example, an accessory may be coupled with the first portion 360 of the motion detector 300. According to an embodiment, types of accessories to be coupled with the right-handed motion detector 300 may be different from types of accessories to be coupled with the left-handed motion detector 300 and an accessory may be coupled with either the right-handed motion detector 300 or the left-handed motion detector 300 only.

According to an embodiment, each of accessories 380, 385, and 390 may include an input unit and a sensor portion, but the present disclosure is not limited thereto. An input unit refers to a unit for a user to input data for controlling the motion detector 300. For example, the input unit may include a key pad, a dome switch, a D-pad touch pad (contact type capacitance type, pressure type resistive film type, infrared ray detection type, a surface acoustic wave type, an integral tension measuring method, a piezo effect type, etc.), a jog wheel, a jog switch, a button, and a lever, but is not limited thereto. As shown in FIGS. 12B and 12C, buttons may be physical buttons attached to the accessories 380 and 385 or may be virtual buttons in the form of graphical user interfaces (GUI).

As shown in FIG. 12B, an accessory according to an embodiment may be a joystick accessory 380 that includes a dome switch. For example, when a user presses the dome switch of the joystick accessory 380, the joystick accessory 380 may transmit an ON or OFF command to the virtual reality providing device 100 via a communication interface.

As shown in FIG. 12C, an accessory according to an embodiment may be a joystick accessory 385 that includes a D-pad. For example, a user may press the D-pad in at least one or more combinations of directions including up, down, left, and right to operate the joystick accessory 385 in directions including up, down, left, and right, upper-left, upper-right, lower-left, and lower-right. Furthermore, the user may leave the D-pad neutral without pressing the same. The user may input various commands including commands for moving an object or a game character in a virtual reality by using the D-pad.

As shown in FIG. 12D, an accessory according to an embodiment may be a gun-like accessory 390. For example, the gun-like accessory 390 may include an optical sensor, and a user may shoot a gun in a virtual reality by pulling a trigger of the gun-like accessory 390.

According to an embodiment, the accessories 380, 385, and 390 may be coupled with the first portion 360 of the motion detector 300 via an interface. According to an embodiment, the accessories 380, 385, and 390 may include magnets. For example, the accessories 380, 385, and 390 may be magnetically coupled with a magnetic base included in the motion detector 300, and magnetism of the magnetic base included in the motion detector 300 may be turned ON/OFF based on a user's manipulation. According to an embodiment, the accessories 380, 385, and 390 may slide to be coupled with the motion detector 300. For example, the accessories 380, 385, and 390 may be pushed into a groove of the motion detector 300. When an accessory is coupled with the motion detector 300, the motion detector 300 may check an electrical terminal recognition or the like and generate motion data regarding device type or device status as described below with reference to FIG. 17.

FIG. 13 is a flowchart for describing a method 1200 of controlling the electronic device 1000 according to an embodiment.

In operation S1310, a coordinate of a user's hand may be obtained based on a magnetic field generated by the source 200. According to an embodiment, the electronic device 1000 detects an intensity of the magnetic field signal generated by the source 200 and may obtain a coordinate of the user's hand. In operation S1320, a change of location of the source 200 due to a movement of the user may be detected. According to an embodiment, when a location of the source 200 is changed due to a movement of the user, the electronic device 1000 may detect a change of location of the source 200 by using at least one sensor. In operation S1330, a coordinate of the user's hand obtained based on the detected change of the location of the source 200 may be reflected to a virtual reality. According to an embodiment, the electronic device 1000 corrects the coordinate of the user's hand in correspondence to the change of the location of the source 200 via the controller 130, and displays an arbitrarily-shaped UI corresponding to the corrected coordinate of the user's hand together with a moving picture or an image provided by the electronic device 1000.

FIG. 14 is a flowchart for describing a process for providing a virtual reality in the method of controlling the electronic device 1000, according to an embodiment.

Continuing from the method 1300, a virtual reality having reflected thereto a coordinate of a user's hand may be provided to a user in operation S1410, after the operation S1330 of FIG. 13. According to an embodiment, a virtual reality provided by the virtual reality providing device 100 may reflect not only the coordinate of the user's hand, but also information including a shape of the user's hand, degrees that respective fingers are bent, an angle of the user's hand, and a revolution of the user's hand, and thus a hand-shaped UI that is identical to or corresponds to an actual shape of the user's hand may be reflected to a virtual reality.

According to an embodiment, as shown in FIGS. 12B through 12D, based on type of an accessory attached to the motion detector 300 or type or predetermined form of content provided by the virtual reality providing device 100, the virtual reality providing device 100 may provide a specialized UI or a specialized graphical user interface (GUI). For example, when the virtual reality providing device 100 provides game content and an accessory attached to the motion detector 300 has a gun-like shape, a gun-like UI having a location and a tilted angle corresponding to a location and a tilted angle of an actual user's hand may be reflected to a virtual reality. Furthermore, for example, when a user pulls a trigger of the gun-like accessory, a bullet may be fired from the gun-like UI in the virtual reality. Since a coordinate of a user's hand is reflected to a virtual reality in correspondence to a movement of the user, the user may be more immersed to the virtual reality.

According to various embodiments, in terms of providing a virtual reality, the virtual reality providing device 100 may display the virtual reality to a user, the virtual reality providing device 100 may transmit a virtual reality to an external display apparatus 400 and the external display apparatus 400 may display the virtual reality, or both the virtual reality providing device 100 and the external display apparatus 400 may display a virtual reality.

Figure 15:
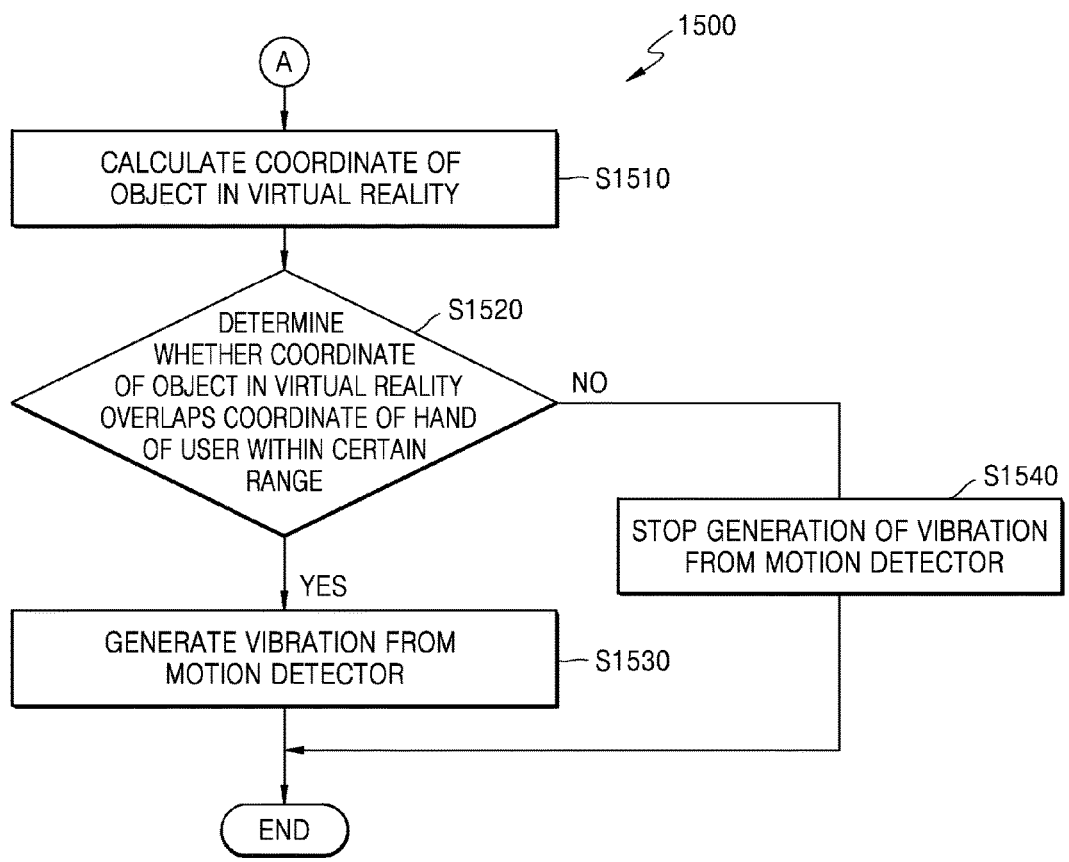
FIG. 15 is a flowchart for describing a method of generating a vibration via the motion detector, according to an embodiment.

FIG. 15 is a flowchart for describing a method 1500 of generating vibration via the motion detector 300, according to an embodiment. According to an embodiment, the method 1500 of FIG. 15 is continued from the method 1300 of FIG. 13.

In operation S1510, after a coordinate of a user's hand is reflected to a virtual reality (operation S1230), the virtual reality providing device 100 may calculate coordinates of an object in the virtual reality. According to an embodiment, the object in the virtual reality is included in a moving picture or an image provided by the virtual reality providing device 100 and may include a human, a thing, an animal, a building, etc. for example, when the virtual reality providing device 100 provides game content, the object in the virtual reality may be a monster in the game content.

In operation S1520, the virtual reality providing device 100 may determine whether the calculated coordinate of the object in the virtual reality overlaps the coordinate of the user's hand within a certain range. According to an embodiment, the certain range may be defined and recognized as a particular area in a moving picture or an image provided by the virtual reality providing device 100 and may include one or more objects or the coordinate of the user's hand. For example, when a particular area including the coordinate of the user's hand overlaps a particular are including the coordinate of an object, the virtual reality providing device 100 may determine that the coordinate of the user's hand overlaps the calculated coordinate of the object in the virtual reality within a certain range.

In operation S1530, when the virtual reality providing device 100 determines that the coordinate of the user's hand overlaps the calculated coordinate of the object, the motion detector 300 may generate vibration According to the present embodiment, when the virtual reality providing device 100 determines that the coordinates overlap each other, the virtual reality providing device 100 may also generate various other outputs other than a vibration signal, such as an audio signal (e.g., a notification sound), a video signal, a tactile signal (e.g., a haptic signal) that provides tactile sensation to a user corresponding to an interaction in the virtual reality, or an optical signal. For example, in game content, when a UI indicating a user's hand reflected to a virtual reality grabs a monster, the motion detector 300 may generate vibration, and thus the user may receive a haptic feedback in reality in correspondence to a motion performed in the virtual reality.

In operation S1540, when the virtual reality providing device 100 determines that the coordinates do not overlap each other, the motion detector 300 may stop generating vibration. According to an embodiment, when no vibration is generated before, no change may occur.

A vibration may be generated as an output. However, other than the generation of the vibration, tactile feedback, such as haptic feedback, a sound, or light may be output based on an interaction in the virtual reality according to various embodiments.

FIG. 16 is a diagram for describing fields of motion data generated by the motion detector 300, according to an embodiment.

As shown in FIG. 16, the motion detector 300 may detect a movement of a user by recognizing intensity of an induced current and generate motion data regarding the detected movement of the user. According to an embodiment, motion data regarding a movement of a user may include one or more fields including data start, device type, device status, message type, hand location information, hand revolution information, finger movement information, button information, and data end.

According to an embodiment, the motion detector 300 may transmit motion data regarding the detected movement of the user to the virtual reality providing device 100, and the virtual reality providing device 100 may correct the received motion data in correspondence to the movement of the user, thereby controlling an operation of an object in a virtual reality.

FIG. 17 is a diagram for describing fields of motion data generated by the motion detector 300, according to an embodiment. Referring back to FIG. 15, the motion detector 300 generates one or more fields of motion data regarding a movement of a user including Data Start, Device Type, Device Status, Message Type, Hand Location Information, Hand Revolution Information, Finger Movement Information, Button Information, and Data End. Referring to FIG. 16, the fields of motion data generated by the motion detector 300 will be described in detail.

According to an embodiment, Data Start may notify the beginning of a message and may be used for checking integrity of the message.

According to an embodiment, Device Type may show information indicating whether the motion detector 300 is for left hand or right hand. For example, when the motion detector 300 is for left hand, the Device Type may show a value 1. When the motion detector 300 is for right hand, the Device Type may show a value 2. Furthermore, according to an embodiment, the Device Type may show information regarding a status in which an accessory is coupled with the motion detector 300. For example, the Device Type may show a value 1-1 in correspondence to a joystick accessory coupled with the left-handed motion detector 300, may show 1-2 in correspondence to a gun-like accessory coupled with the left-handed motion detector 300, may show a value 2-1 in correspondence to the joystick accessory coupled with the right-handed motion detector 300, and may show 2-2 in correspondence to the gun-like accessory coupled with the right-handed motion detector 300.

According to an embodiment, Device Status may show a current status of the motion detector 300. For example, Disconnected may indicate a status that a connection to the motion detector 300 is disconnected, Calibrating may indicate a status that initial setting values are being calibrated, Disabled may indicate a status that a connection to the motion detector 300 is established but an operation of the motion detector 300 is stopped, and Connected may indicate a status that data is normally transmitted and received.

According to an embodiment, Message Type may indicate the type of a current message. For example, Information may indicate device information, whereas Action may indicate information regarding a movement of a device.

According to an embodiment, Hand Location Information may be information showing a relative location of the virtual reality providing device 100 in relation to the source 200 as x-axis, y-axis, and z-axis coordinates, whereas Hand Revolution Information may be information showing a relative revolution of the virtual reality providing device 100 in relation to the source 200 as x-axis, y-axis, and z-axis revolutions. For example, the Hand Location Information may show (0.44, 0.31, 0.21), whereas the Hand Revolution Information may show ($\pi/6$, $\pi/3$, 0).

According to an embodiment, Finger Movement Information may be a value indicating information regarding a movement of a finger. For example, bending of respective fingers may be indicated with real number values from 0 to 1. For example, 0 may indicate a state that a finger is fully opened, whereas 1 may indicate a state that a finger is bent as much as possible.

According to an embodiment, Button Information indicates a state that a physical button is pressed. For example, 0 may indicate a state that the button is not pressed, 0.5 may indicate a state that the button is half pressed, and 1 may indicate a state that the button is fully pressed. According to an embodiment, Data End may notify the end of data and may be used for checking integrity of the data.

According to the present disclosure, a movement of a user's hand may be accurately reflected to a virtual reality and the user's hand may interact with content via haptic. Therefore, a realistic impression of the virtual reality may be provided to the user. Furthermore, interactive content may be provided to the user instead of simple passive content.

The device described herein may comprise a processor, a memory for storing program data and executing it, a permanent storage unit such as a disk drive, a communications port for handling communications with external devices, and user interface devices, including a touch panel, keys, buttons, etc. When software modules or algorithms are involved, these software modules may be stored as program instructions or computer readable codes executable on a processor on a computer-readable medium. Examples of the computer readable recording medium include magnetic storage media (e.g., ROM, floppy disks, hard disks, etc.), and optical recording media (e.g., CD-ROMs, or DVDs). The computer readable recording medium can also be distributed over network coupled computer systems so that the computer readable code is stored and executed in a distributed fashion. This media can be read by the computer, stored in the memory, and executed by the processor.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

Throughout the present specification, the term "unit," "module," or the like means a unit for processing at least one function or operation, and this unit may be implemented by hardware, software, or a combination thereof.

The term "unit" or "module" may also be stored in an addressable storage medium or may also be configured to operate one or more processors.

The term "unit" or "module" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables, although not limited thereto.

What is claimed is:

1. An electronic device comprising:
   a source configured to generate a magnetic field;
   a motion detector configured to obtain a coordinate of a user's hand based on the generated magnetic field; and
   a virtual reality providing device configured to reflect the coordinate of the user's hand received from the motion detector in a virtual reality environment based on a change of a location of the source due to a movement of the user,
   wherein the virtual reality providing device is further configured to display an object resembling a type of an accessory coupled to the motion detector together with the user's hand,
   wherein the source and the virtual reality providing device are implemented as a hardware device.

2. The electronic device of claim 1, wherein the source is further configured to be attachable to and detachable from the virtual reality providing device.

3. The electronic device of claim 1, wherein the virtual reality providing device is further configured to correct the coordinate of the user's hand, received from the motion detector, based on the location of the source, in relation to a portion of the body of the user based on the change of the location of the source due to the movement of the user.

4. The electronic device of claim 1, wherein the virtual reality providing device comprises:
   a communicator configured to communicate with the motion detector;
   a sensor configured to detect the movement of the user; and
   a processor configured to obtain a coordinate of the user's hand by correcting the coordinate of the user's hand received from the motion detector based on a portion of the body of the user being used as a reference point.

5. The electronic device of claim 4, wherein the virtual reality providing device further comprises a display configured to display the virtual reality environment having reflected therein the coordinate of the user's hand to the user.

6. The electronic device of claim 1, wherein the virtual reality providing device is further configured to generate a vibration generating signal based on a coordinate of an object in the virtual reality environment and the coordinate of the hand of the user.

7. A method of controlling an electronic device, the method comprising:
- based on a magnetic field generated by a source, obtaining a coordinate of a user's hand based on the generated magnetic field;
- reflecting the obtained coordinate of the user's hand in a virtual reality environment based on a change of a location of the source due to a movement of the user; and
- displaying an object resembling a type of an accessory coupled to a motion detector together with the user's hand.

8. The method of claim 7, further comprising attaching the source generating a magnetic field to the virtual reality providing device,
- wherein, in the obtaining of the coordinate of the user's hand, the coordinate of the user's hand is obtained based on the magnetic field generated by the attached source.

9. The method of claim 7, wherein the reflecting of the obtained coordinate of the user's hand in the virtual reality comprises correcting the coordinate of the user's hand based on a location of the source in relation to a portion of the body of the user as a reference point, and the detected change of the location of the source due to the movement of the user.

10. The method of claim 7, further comprising displaying the virtual reality environment having reflected therein the coordinate of the user's hand to the user.

11. The method of claim 7, further comprising transmitting the virtual reality environment having reflected therein the coordinate of the user's hand to an external display apparatus.

12. The method of claim 7, further comprising generating a vibration generating signal based on a coordinate of an object in the virtual reality environment and the reflected coordinate of the user's hand.

13. The method of claim 12, wherein the generating of the vibration generating signal comprises:
- calculating the coordinate of an object in the virtual reality environment;
- determining whether the coordinate of the object overlaps the reflected coordinate of the user's hand within a certain range; and
- generating a vibration based on a result of the determining.

14. The method of claim 7, wherein the obtaining of the coordinate of the user's hand comprises further obtaining finger movement information regarding the user by using at least one sensor located at a side of a motion detector that obtains the coordinate of the user's hand.

* * * * *